United States Patent
Yamauchi et al.

(10) Patent No.: US 10,082,171 B2
(45) Date of Patent: Sep. 25, 2018

(54) BASE MEMBER WITH NUT PRESS-FIT PORTION

(71) Applicants: FURUKAWA ELECTRIC CO., LTD., Tokyo (JP); FURUKAWA AUTOMOTIVE SYSTEMS INC., Shiga (JP)

(72) Inventors: Yuji Yamauchi, Shiga (JP); Tomoharu Ito, Shiga (JP); Hideki Nakazato, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 15/128,426

(22) PCT Filed: Mar. 19, 2015

(86) PCT No.: PCT/JP2015/001553
§ 371 (c)(1),
(2) Date: Sep. 22, 2016

(87) PCT Pub. No.: WO2015/146096
PCT Pub. Date: Oct. 1, 2015

(65) Prior Publication Data
US 2017/0108028 A1     Apr. 20, 2017

(30) Foreign Application Priority Data

Mar. 27, 2014   (JP) .................................. 2014-066930

(51) Int. Cl.
*F16B 37/04*     (2006.01)
*F16B 37/06*     (2006.01)
(Continued)

(52) U.S. Cl.
CPC ............ *F16B 37/048* (2013.01); *F16B 4/004* (2013.01); *F16B 17/002* (2013.01); *F16B 37/068* (2013.01)

(58) Field of Classification Search
CPC ...... F16B 37/068; F16B 37/122; F16B 4/004; F16B 17/002
(Continued)

(56) References Cited

U.S. PATENT DOCUMENTS 2,551,834 A * 5/1951 Ferguson ................ B29C 41/14
138/96 T
4,089,612 A * 5/1978 Mazzeo .................. F16B 4/004
403/282
(Continued)

FOREIGN PATENT DOCUMENTS

JP   H09296815 A   11/1997
JP   2011-239600 A   11/2011

OTHER PUBLICATIONS

International Search Report for PCT Application No. PCT/JP2015/001553 dated May 26, 2015, 2 pages.

*Primary Examiner* — Flemming Saether
(74) *Attorney, Agent, or Firm* — Amin, Turocy & Watson, LLP (57) ABSTRACT

A nut press-fit portion (8) includes a bottom surface (12), inner peripheral wall surfaces (14), press-fit ribs (10), and contact parts (11). The bottom surface (12) is opposing to a press-fit direction. The inner peripheral wall surfaces (14) are generally parallel to the press-fit direction. The press-fit ribs (10) are protruded from the inner peripheral wall surfaces (14) and elongated along the press-fit direction so as to contact the peripheral surfaces of a press-fitted nut (7). The contact parts (11) are disposed above the bottom surface (12) so as to contact the press-fitted nut (7) from below. Furthermore, the contact parts (11) are disposed so as neither (Continued)

to interfere with shavings reachable regions (21) nor to overlap the shavings reachable regions (21) in the press-fit direction, the shavings reachable regions (21) being imaginary extensions of the press-fit ribs (10) in the direction of protrusion thereof from the inner peripheral wall surfaces (14).

12 Claims, 9 Drawing Sheets

(51) Int. Cl.
*F16B 4/00* (2006.01)
*F16B 17/00* (2006.01)

(58) Field of Classification Search
USPC .......................................... 411/180, 377, 431
See application file for complete search history.

(56) References Cited

U.S. PATENT DOCUMENTS

| 4,962,968 | A | * | 10/1990 | Caplin | B60B 7/00 301/108.5 |
|---|---|---|---|---|---|
| 5,071,197 | A | * | 12/1991 | Webster | B60B 7/08 301/37.372 |
| 5,082,409 | A | * | 1/1992 | Bias | F16B 37/14 411/372.5 |
| 5,795,117 | A | | 8/1998 | Onoda | |
| 6,029,922 | A | * | 2/2000 | Kim | A01K 89/006 24/113 MP |
| 6,398,471 | B1 | * | 6/2002 | Fischer | F16B 31/02 411/431 |
| 8,272,528 | B2 | * | 9/2012 | Dunn | E03B 7/07 220/3.3 |
| 2013/0051909 | A1 | * | 2/2013 | Takahashi | B29C 65/64 403/345 |

* cited by examiner

BASE MEMBER WITH NUT PRESS-FIT PORTION

CROSS-REFERENCE TO RELATED APPLICATIONS

This patent application is a U.S. National Stage filing under 35 USC § 371 of international Patent Cooperation Treaty (PCT) Application No. PCT/JP2015/001553, filed on Mar. 19, 2015, and entitled "BASE MEMBER WITH NUT PRESS-FIT PORTION," which claims priority to Japanese Patent Application No. 2014-066930, filed on Mar. 27, 2014, both of which applications are hereby incorporated by reference herein in their respective entireties.

TECHNICAL FIELD

The present invention mainly relates to a configuration of a nut press-fit portion formed in a base body made of resin for press-fitting a nut.

BACKGROUND ART

There are cases when a nut made of metal is press-fitted and fixed to a base body made of synthetic resin. Such configuration is, for example, described in Patent Document 1.

Patent Document 1 discloses a configuration in which a nut housing portion for press-fitting a connection nut is formed in the electric junction box body made of synthetic resin. With respect to this nut housing portion, press-fit ribs are formed for absorbing a variation of tolerance and the like.

The problem that scrap resins (shavings) are produced by the press-fit ribs being abraded and shaved when the connection nut is press-fitted to the nut housing portion has been pointed out by Patent Document 1. Regarding this, Patent Document 1 discloses a configuration in which scrap resin housing hollows are formed on a bottom surface of the nut housing portion. Patent Document 1 indicates that, since scrap resins produced by press-fitting the nut are stowed to the scrap resin housing hollows, a defect that scrap resins are caught between the bottom surface and the nut of the nut housing portion and thereby the nut is floated from the nut housing portion or inclined and the like can be prevented.

PRIOR-ART DOCUMENTS

Patent Documents

Patent Document 1: Japanese Patent Application Laid-Open No. 2011-239600

SUMMARY OF THE INVENTION

Problems to be Solved by the Invention

There are cases when scrap resin produced by shaving of the press-fit ribs is formed into a slender belt-like shape as with so-called wood shavings. However, since the scrap resin housing hollow of Patent Document 1 is formed only around the press-fit rib, it is difficult to say that the shape of said hollow is preferable for stowing the slender belt-like shaped scrap resins. Accordingly, when the slender belt-like shaped scrap resins are produced, it is considered that there are cases when scrap resins are protruded over the scrap resin housing hollow.

The present invention has been made in view of the circumstances described above, and a primary object is to provide a configuration that can surely prevent shavings of press-fit ribs from getting between a nut and a bottom surface.

Means for Solving the Problems and Effects Thereof

Problems to be solved by the present invention are as described above, and next, means for solving the problems and effects thereof will be described.

In a first aspect of the present invention, a base body including a nut press-fit portion to which a nut is press-fitted in a press-fit direction is provided as follows. That is, the nut press-fit portion includes a bottom surface, inner peripheral wall surfaces, press-fit ribs, and contact parts. The bottom surface is opposing to the press-fit direction. The inner peripheral wall surfaces are generally parallel to the press-fit direction. The press-fit ribs are protruded from the inner peripheral wall surfaces and elongated along the press-fit direction so as to contact peripheral surfaces of the press-fitted nut. The contact parts are arranged in an upstream side of the bottom surface in the press-fit direction so as to contact the press-fitted nut from a downstream side in the press-fit direction. Furthermore, the contact parts are not disposed to positions that will overlap toward loca of the press-fit ribs in the press-fit direction, the loca being imaginary drawn by the press-fit ribs when the press-fit ribs are virtually moved along the protruding direction thereof to the opposing inner peripheral wall surfaces.

That is, shavings produced by abrasion of the press-fit ribs tend to occur in such a manner as to project toward the protruding direction of the press-fit ribs. Accordingly, the contact parts are not disposed in said regions, which can prevent the shavings from getting between the nut and the contact parts.

The above-described base body is preferably configured as follows. That is, an internal circumference shape of the nut press-fit portion is formed into a polygon in accordance with a peripheral shape of the nut. The press-fit ribs are formed in the vicinity of the center parts of the sides of the polygon. The contact parts are disposed in the vicinity of the corners of the polygon.

Accordingly, the corners of the press-fitted nut can be supported from below by disposing the contact parts in the vicinity of the corners of the polygon, and thereby the nut can be stably supported.

In the above-described base body, the contact parts are preferably disposed in the vicinity of each of the corners of the polygon.

Accordingly, each of the corners of the nut can be supported from below by disposing the contact parts in each of the corners of the polygon. As such, the nut can be stably supported.

In a second aspect of the present invention, a base body including a nut press-fit portion to which a nut is press-fitted in a press-fit direction is provided as follows. That is, the nut press-fit portion includes a bottom surface, inner peripheral wall surfaces, press-fit ribs, and contact parts. The bottom surface is opposing to the press-fit direction. The inner peripheral wall surfaces are generally parallel to the press-fit direction. The press-fit ribs are protruded from the inner peripheral wall surfaces and elongated along the press-fit direction so as to contact peripheral surfaces of the press-fitted nut. The contact parts are arranged in an upstream side of the bottom surface in the press-fit direction so as to contact the press-fitted nut from a downstream side in the press-fit direction. Furthermore, an internal circumference shape of the nut press-fit portion is formed into a polygon in accordance with a peripheral shape of the nut. The press-fit ribs are formed in the vicinity of the center part of each of the sides of the polygon. The contact parts are disposed in the vicinity of at least two corners among the corners of the polygon leaving a space between each other.

With this configuration, the contact parts can be arranged while avoiding the circumferences of the press-fit ribs. Accordingly, shavings produced by abrasion of the press-fit ribs are prevented from getting between the contact parts and the nut. Since the contact parts are arranged as above, at least two corners of the nut are contacted with the contact parts from below. As such, the nut can be stably supported.

The above-described base body is preferably configured as follows. That is, a distance between the contact parts and the bottom surface in the press-fit direction is longer than a distance between upstream end portions of the press-fit ribs and the contact parts in the press-fit direction.

Thus, even if the shavings produced by abrasion of the press fit ribs hanged down in band forms, tip ends of the shavings do not come into contact with the bottom surface.

The above-described base body is preferably configured as follows. That is, the press-fit ribs are formed continuously in the press-fit direction. Downstream end portions of the press-fit ribs in the press-fit direction are connected to the bottom surface.

By forming the press-fit ribs continuously down to the bottom surface, the shavings can be prevented from being torn off in the middle and being separated from the press-fit ribs. Furthermore, strength of the press-fit ribs can be ensured by connecting the press-fit ribs to the bottom surface.

In another aspect of the present invention, an electric junction box including the above-described base body is provided.

In this electric junction box, the nut can be surely fixed to the base body. Accordingly, reliability of the electric junction box can be improved.

In yet another aspect of the present invention, a terminal unit including the above-described base body is provided.

In this terminal unit, the nut can be surely fixed to the base body. Accordingly, reliability of the electric junction box can be improved.

EMBODIMENT FOR CARRYING OUT THE INVENTION

Next, an embodiment of the present invention will be described with reference to the drawings.

Figure 1:
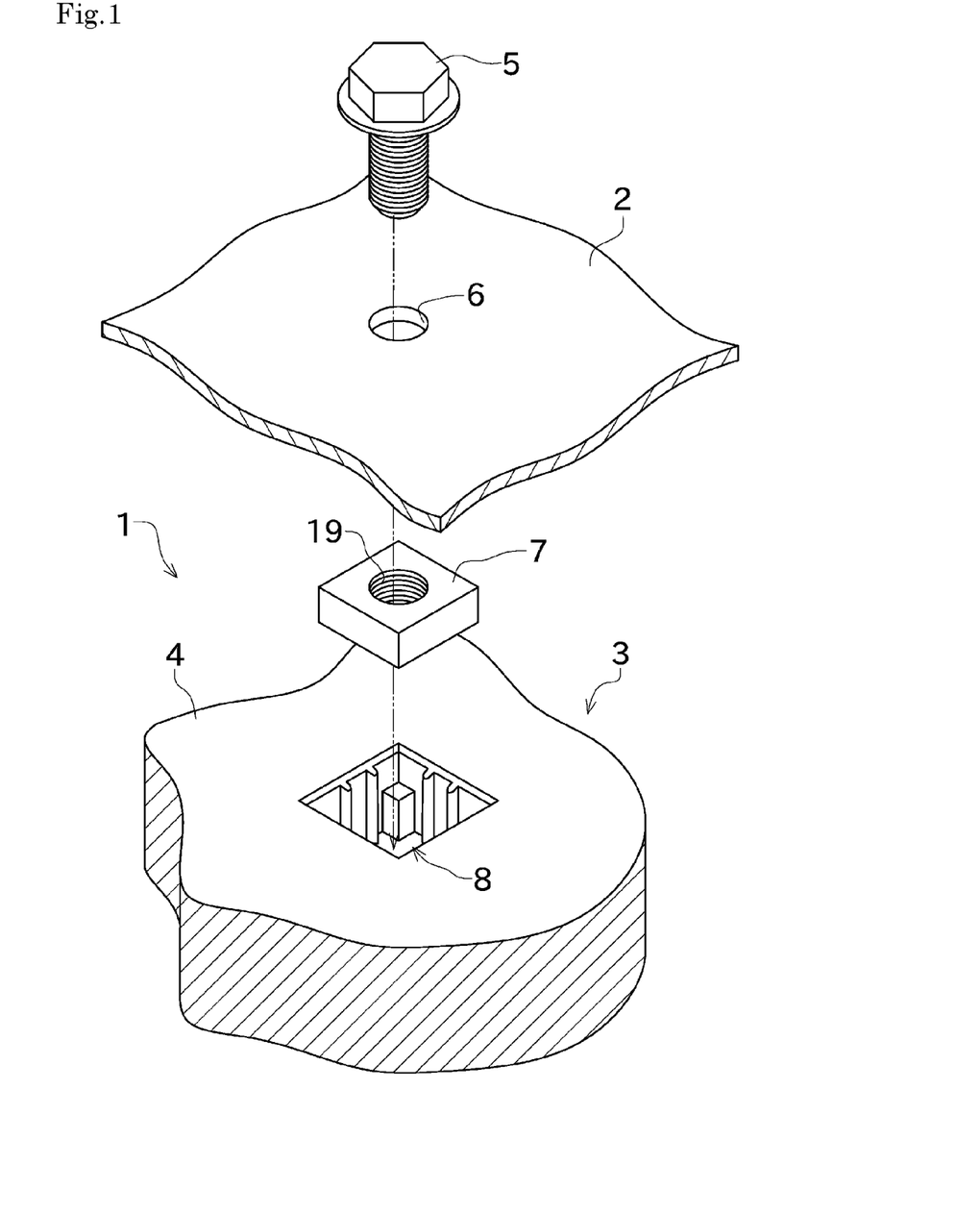
FIG. 1 A perspective view illustrating a state where a plate or the like is attached to a base body according to one embodiment of the present invention.

An electric junction box 1 of the present embodiment includes a base body 3 and a plate 2. FIG. 1 is a perspective view illustrating an attachment structure for attaching the plate 2 toward the base body 3 according to one embodiment of the present invention. There are cases when the electric junction box 1 includes an upper case that lies above the base body 3 and a lower case that lies below the base body 3. Since the configuration of the electric junction box is publicly known, the upper case and the lower case are abbreviated in the drawings.

The base body 3 is configured from synthetic resin and generally forming a block. A part of the base body 3 is illustrated in FIG. 1 etc. The base body 3 has an attachment surface 4 to which the plate 2 is attached. In the present embodiment, the plate 2 is a connecting plate made of metal. Any plate is acceptable as a plate 2 as long as having a plate form. No specific materials and functions are required as the plate 2. For example, the plate 2 may be a terminal, a circuit board, a bus bar, or a stay etc.

An insertion hole 6 is formed on the plate 2 so that a bolt 5 made of metal is inserted into the insertion hole 6. On the other hand, a nut press-fit portion 8 is formed in the attachment surface 4 of the base body 3 so that a nut 7 made of metal is fitted to the nut press-fit portion 8. The nut press-fit portion 8 is configured in such a manner that the nut 7 is press-fitted and fixed.

In the following description, a direction (a direction shown by an outline arrow in FIG. 5) to which the nut 7 is press-fitted toward the nut press-fit portion 8 is referred to as "the press-fit direction." In the following description, the press-fit direction is considered as downward. Therefore, a downstream side (a down side in FIG. 5) of the press-fit direction is simply referred to as "down", and an upstream side (an upper side in FIG. 5) of the press-fit direction is simply referred to as "up." However, these designation are merely for convenience for making the description easy to understand. That is, the press-fit direction is not limited to the downward direction.

When the plate 2 is attached to the base body 3, the nut 7 is press-fitted to the nut press-fit portion 8 in advance. And the bolt 5 is inserted into the insertion hole 6 of the plate 2, and the bolt 5 is threaded into said nut 7. As such, the plate 2 is fixed to the attachment surface 4 of the base body 3. A state where the plate 2 is fixed to the attachment surface 4 is illustrated in a cross-sectional view of FIG. 8.

Next, a detailed description will be given of a configuration of the nut press-fit portion 8.

Figure 2:
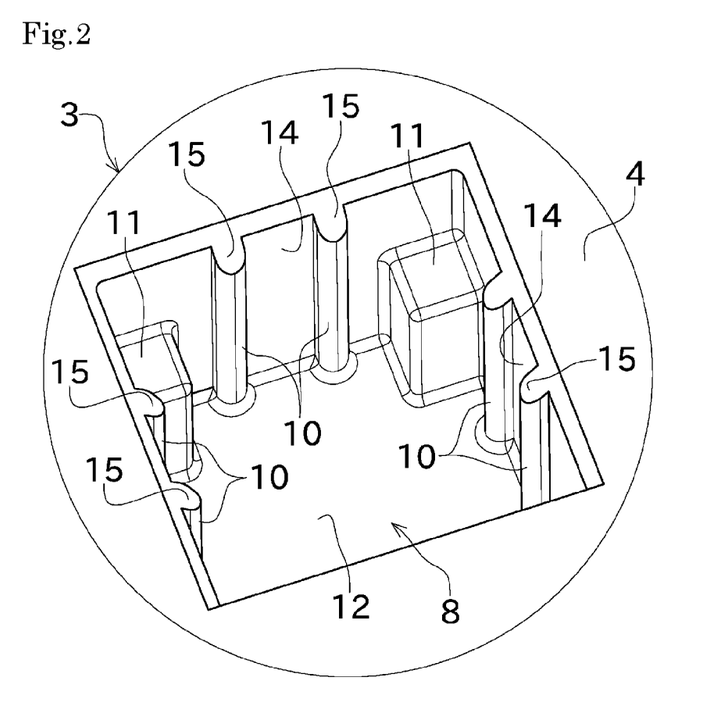
FIG. 2 A perspective view illustrating a nut press-fit portion in an enlarged manner.
Figure 3:
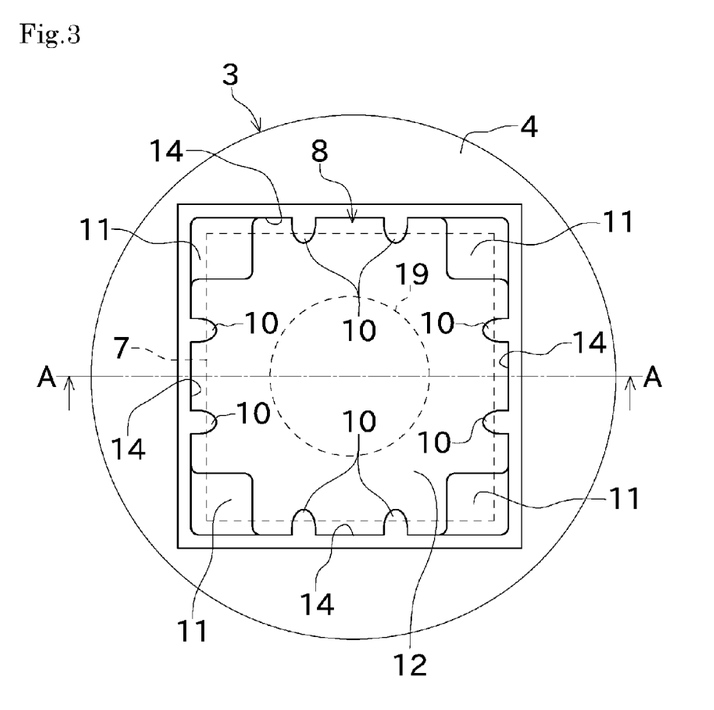
FIG. 3 A plane view of the nut press-fit portion.
Figure 5:
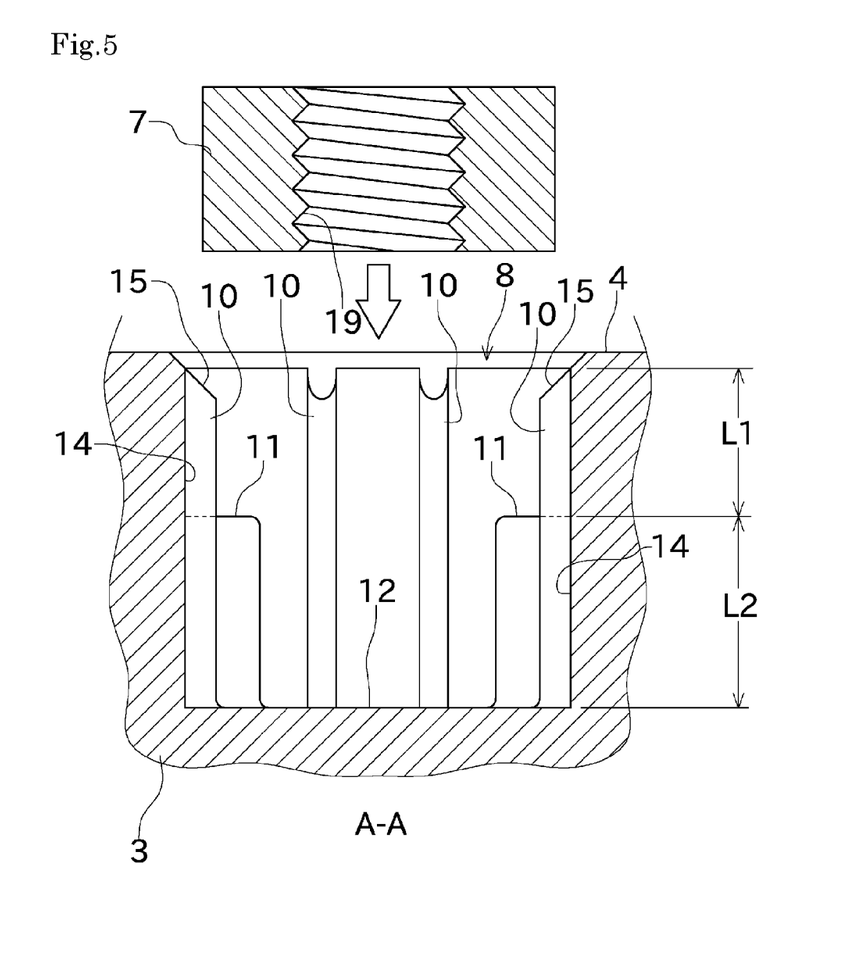
FIG. 5 A side cross-sectional view of the nut press-fit portion.

As illustrated in FIG. 2, FIG. 3, and FIG. 5, the nut press-fit portion 8 includes inner peripheral wall surfaces 14, a bottom surface 12, press-fit ribs 10, and contact parts 11. Since the nut press-fit portion 8 is integrally formed with the base body 3 made of synthetic resin, each configuration of the nut press-fit portion 8 is formed by synthetic resin.

The nut press-fit portion 8 is configured as a recess formed in such a manner as to be depressed in the press-fit direction toward the attachment surface 4. The bottom surface 12 is provided to be opposing to the press-fit direction, configuring a bottom of the nut press-fit portion. The bottom surface 12 of the present embodiment is formed orthogonally to the press-fit direction, having an approximately plane form facing the upper side.

The inner peripheral wall surfaces 14 are formed as wall surfaces parallel to the press-fit direction, configuring the internal circumference of the nut press-fit portion 8. An internal circumference shape of the nut press-fit portion 8 is formed into a polygon in accordance with a peripheral shape of the nut 7. More specifically, as viewed in the press-fit direction as shown in FIG. 3, the inner peripheral wall surfaces 14 are formed into a polygon shape in accordance with the peripheral shape of the nut 7. Since the nut 7 of the present embodiment is a square nut (or a plate nut) (see FIG. 1), the inner peripheral wall surfaces 14 of the nut press-fit portion 8 are formed into a quadrilateral shape.

Press-fit ribs 10 are parts having rib-like forms that are integrally formed with the inner peripheral wall surfaces 14. The press-fit ribs 10 are formed in such a manner as to protrude toward a normal lines of the inner peripheral wall surfaces 14. The press-fit ribs 10 are elongatedly formed along the press-fit direction (parallel to the press-fit direction) of the nut 7. As illustrated in FIG. 2 and FIG. 5, the press-fit ribs 10 are formed continuously from an upper end vicinity of the inner peripheral wall surfaces 14 to a lower end of the inner peripheral wall surfaces 14. That is, the press-fit ribs 10 are formed approximately throughout the press-fit direction in the inner peripheral wall surfaces 14.

As illustrated in FIG. 2 and FIG. 5, an upper end portions (an upstream side end portion in the press-fit direction) of the press-fit ribs 10 have inclined planes 15. The inclined planes 15 are formed as planes that are inclined relative to the attachment surface 4. Each of the inclined plane 15 inclines so as to approach the bottom surface 12 in correspondence with an increase in distance from the inner peripheral wall surface 14. As illustrated in FIG. 2 and FIG. 5, lower end portions of the press-fit ribs 10 are connected to the bottom surface 12.

In the present embodiment, as illustrated in FIG. 3, two press-fit ribs 10 are formed on each of the four "sides" of the quadrilateral shape when viewing the inner peripheral wall surfaces 14 in a press-fit direction. Accordingly, the nut press-fit portion 8 of the present embodiment includes eight press-fit ribs 10.

Figure 7:
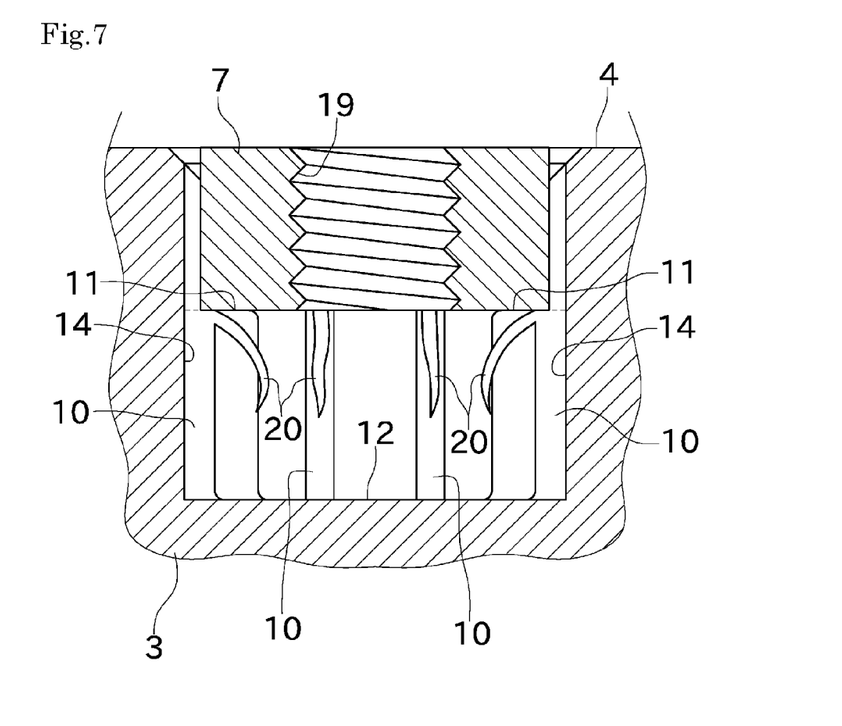
FIG. 7 A side cross-sectional view illustrating a state where the nut is press-fitted completely toward the nut press-fit portion.

The contact parts 11 are parts that come into contact with the nut 7 press-fitted to the nut press-fit portion 8 from lower side. FIG. 7 illustrates a state where the contact parts 11 come into contact with the nut 7 from below. Each of the contact parts 11 of the present embodiment is configured as a plane facing upper side, and arranged orthogonally to the press-fit direction. As illustrated in FIG. 2 and FIG. 5, the contact parts 11 are disposed above the bottom surface 12 (upstream side in the press-fit direction).

As illustrated in FIG. 3, the contact parts 11 are provided in the vicinity of each of the four "corners" corresponding parts of the quadrilateral shape when viewing the inner peripheral wall surfaces 14 in a press-fit direction. Each of the contact parts 11 is leaving a space between each other. Accordingly, the nut press-fit portion 8 of the present embodiment includes four contact parts 11. "The contact parts 11 are leaving a space between each other" is meant that each of the contact parts 11 is divided into sections by regions where the contact parts 11 do not contact the nut 7 from below. In the present embodiment, for example, when viewed in the press-fit direction as shown in FIG. 3, the regions between each of the contact parts 11 are forming the bottom surface 12. Since the bottom surface 12 is positioned below the contact parts 11, the bottom surface 12 does not come into contact with the nut 7 from below. Accordingly, in the present embodiment, it can be said that the contact parts 11 disposed in the vicinity of each of the four corners of the quadrilateral shape when viewed the inner peripheral wall surfaces 14 in the press-fit direction, are arranged separately with each other.

As shown in FIG. 3, when focusing on one "side" of the quadrilateral shape when viewed the inner peripheral wall surfaces 14 in the press-fit direction, the contact parts 11 are disposed in the vicinity of opposed ends of the side, and the two press-fit ribs 10 are disposed in the vicinity of the center of the side, respectively. Accordingly, it can also be said that the press-fit ribs 10 are arranged between the two contact parts 11.

FIG. 3 illustrates the nut 7 that is press-fitted to the nut press-fit portion 8 in a dotted line. As shown in FIG. 3, when viewed in the press-fit direction, a tip end of each of the press-fit ribs 10 is overlapped with a surrounding wall of the nut 7. Accordingly, when the nut 7 is press-fitted to the nut press-fit portion 8, the tip ends of the press-fit ribs 10 come into contact with the peripheral surface of the nut 7.

When viewed in the press-fit direction as shown in FIG. 3, the contact parts 11 are configured in such a manner as to overlap the four corners of the nut 7. Accordingly, when the nut 7 is press-fitted to the nut press-fit portion 8, the contact parts 11 come into contact with the four corners of the nut 7 from below.

In FIG. 3, a screw hole 19 of the nut 7 is illustrated in a dotted line. When viewed in the press-fit direction as shown in FIG. 3, the press-fit ribs 10 and the contact parts 11 are disposed so as not to overlap inner side of the screw hole 19. Accordingly, when the bolt 5 is threaded into the screw hole 19 of the nut 7 and a tip end of the bolt 5 is protruded from an under surface of the nut 7, neither the press-fit ribs 10 nor the contact parts 11 interferes the tip end portion of the bolt 5. Thus, the bolt 5 can be threaded into the nut 7.

Next, a description will be given of a state where the nut 7 is press-fitted to the nut press-fit portion 8 having the above-described configuration.

As illustrated in FIG. 5, the nut 7 is inserted into the nut press-fit portion 8 in the press-fit direction (downward direction in FIG. 5) from the upper side of the nut press-fit portion 8. At this time, the nut 7 comes into contact with the inclined planes 15 that are formed on upper ends of the press-fit ribs 10. Accordingly, the nut 7 is guided by the inclined planes 15 and thereby the nut 7 is centered with respect to the nut press-fit portion 8.

Figure 6:
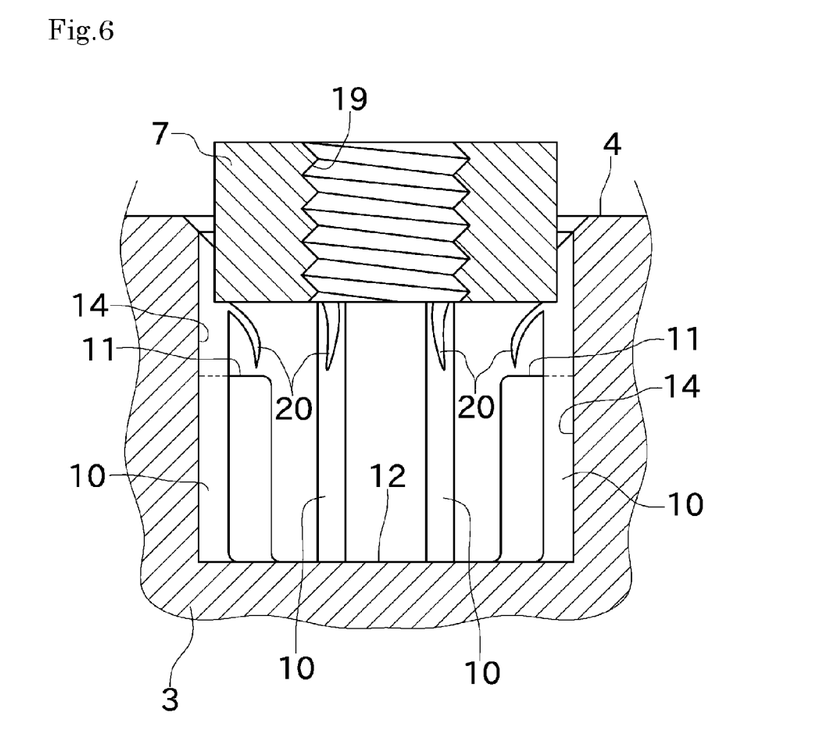
FIG. 6 A side cross-sectional view illustrating a state where a nut is press-fitted halfway into the nut press-fit portion.

Thus, the nut 7 is centered with respect to the nut press-fit portion 8 and then pushed in the press-fit direction (FIG. 6). This enables the peripheral surface of the nut 7 to come into contact with the plurality of press-fit ribs 10 uniformly. In the present embodiment, the two press-fit ribs 10 are formed on each of the sides of the inner peripheral wall surfaces 14 having the quadrilateral form when viewed from the press-fit direction. Accordingly, the press-fit ribs 10 come into contact with the outer peripheral surface of the nut 7 from four sides uniformly. Thus, unsteadiness of the nut 7 in a plane orthogonal to the press-fit direction can be prevented.

Since the nut 7 is press-fitted while contacting the press-fit ribs 10, the press-fit ribs 10 are shaved by the nut 7 and thereby shavings (scrap resins) 20 are produced (see FIG. 6). Details of the shavings 20 will be given later.

When the nut 7 is gradually press-fitted in the press-fit direction, the contact parts 11 come into contact with the under surface of the nut 7 from below (a state shown in FIG. 7). Accordingly, positioning of the nut 7 is determined in the press-fit direction, and the nut 7 can be supported by the contact parts 11 from below. Thus, fixation of the nut 7 with respect to the nut press-fit portion 8 is completed.

Distance between the attachment surface 4 and the contact parts 11 in the press-fit direction is generally the same as the thickness (length in the press-fit direction) of the nut 7. Accordingly, when the nut 7 is fixed to the nut press-fit portion 8, an upper surface of the nut 7 and the attachment surface 4 are disposed substantially in the same surface (see FIG. 7).

In this way, the nut 7 is fixed to the nut press-fit portion 8, and thereby the plate 2 can be attached to the attachment surface 4 of the base body 3. That is, as described above, the bolt 5 is inserted into the insertion hole 6 of the plate 2 (see FIG. 1), and the bolt 5 is threaded into the nut 7. Thus, the plate 2 can be fixed to the attachment surface 4 of the base body 3 (a state of FIG. 8).

Figure 8:
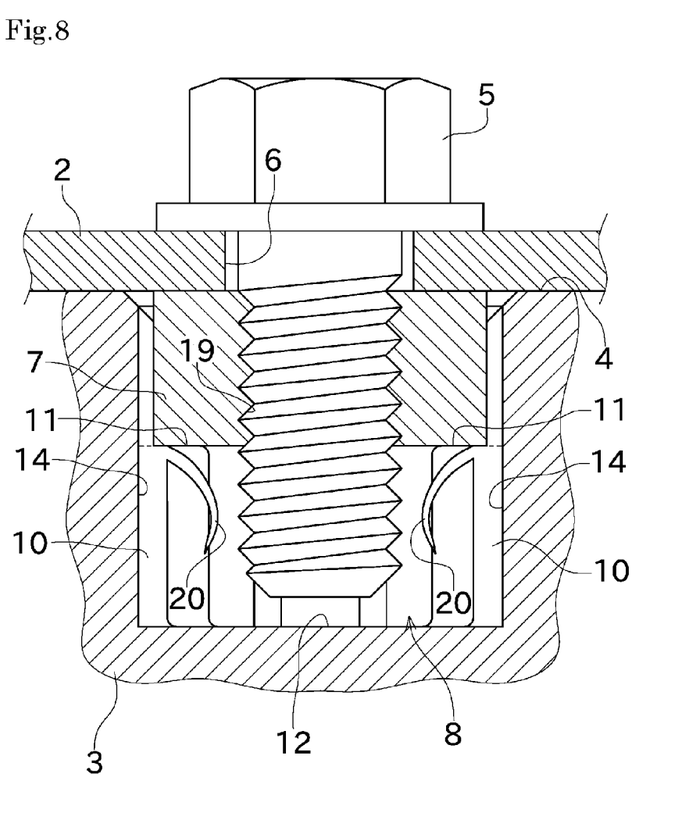
FIG. 8 A side cross-sectional view illustrating a state where the plate is attached to the base body.

As illustrated in FIG. 8, the tip end of the bolt 5 can be protruded downward from the bottom surface of the nut 7 that is press-fitted to the nut press-fit portion 8. Accordingly, it can also be said that, a space below the press-fitted nut 7 in the nut press-fit portion 8 (a space in a downstream side of the contact parts 11 in the press-fit direction) is a space for housing the tip end of the bolt 5.

Next, characteristics of the present embodiment will be described.

As mentioned above, when the nut 7 is press-fitted to the nut press-fit portion 8, the press-fit ribs 10 are shaved and the shavings are produced. When the shavings 20 are caught between the nut 7 and the contact parts 11, the press-fitted nut 7 is floated from the contact parts 11. As a result, there are concerns that the nut 7 is protruded upward from the attachment surface 4 or the nut 7 is inclined.

Accordingly, spaces for escaping the shavings 20 around each of the press-fit ribs 10 are provided in the base body 3 of the present embodiment. More specifically, as illustrated in FIG. 2 and FIG. 3, the contact parts 11 are not disposed around each of the press-fit ribs 10. That is, as viewed in the press-fit direction, the bottom surface 12 is formed around the press-fit ribs 10.

Accordingly, even if the shavings 20 are produced by abrasion of the press-fit ribs 10, the contact parts 11 are not positioned around the press-fit ribs 10. Therefore, there are no concerns that the shavings 20 are caught between the contact parts 11 and the nut 7. As such, floating of the nut 7 from the contact parts 11 can be prevented.

The configuration of providing the scrap resin housing hollows around the press-fit ribs 10 for housing the shavings 20 has been described in Patent Document 1. However, in Patent Document 1, since the scrap resin housing hollows are merely provided around the press-fit ribs 10, there are concerns that the shavings 20 do not fit in the scrap resin housing hollows.

A detailed description will be given in this respect. That is, the shavings 20 are produced by abrasion of the end portion of the press-fit ribs 10 along the protruding direction. Accordingly, as illustrated in FIG. 6 and FIG. 7, the shavings 20 tend to be formed in such a manner as to project toward the protruding directions (the normal line directions of the inner peripheral wall surfaces 14). Furthermore, since the shavings 20 are produced by abrasion of the elongated press-fit ribs 10, as illustrated in FIG. 6 and FIG. 7, the shavings 20 are often formed into slender belt-like shape.

As such, when the elongated shavings 20 are produced so as to project from the press-fit ribs 10, there are high possibility that the shavings 20 do not fit in the scrap resin housing hollows of Patent Document 1. Accordingly, in the configuration of Patent Document 1, it is considered that there are cases when the shavings are extruded from the scrap resin housing hollows. Furthermore, in the configuration of Patent Document 1, if the shavings are extruded from the scrap resin housing hollows, there are concerns that the shavings are caught between the nut and the bottom surface (which is equivalent to the contact parts of the present embodiment). This will cause floating of the nut from the bottom surface.

Accordingly, in the present embodiment, artifice is made for surely preventing the shavings 20 from getting between the nut 7 and the contact parts 11 even if the above-described slender belt-like shape shavings 20 are produced. As such, a detailed description will be given in this respect.

As mentioned above, the shavings 20 tend to be formed in such a manner as to project toward the protruding directions of the press-fit ribs 10. The regions where the shavings 20 will easily reach are indicated by a reference code 21 and hatch patterns in FIG. 4. The regions of the reference code 21 is referred to as "shavings reachable regions" meaning that the regions are easily reachable by the protruding shavings 20.

Figure 4:
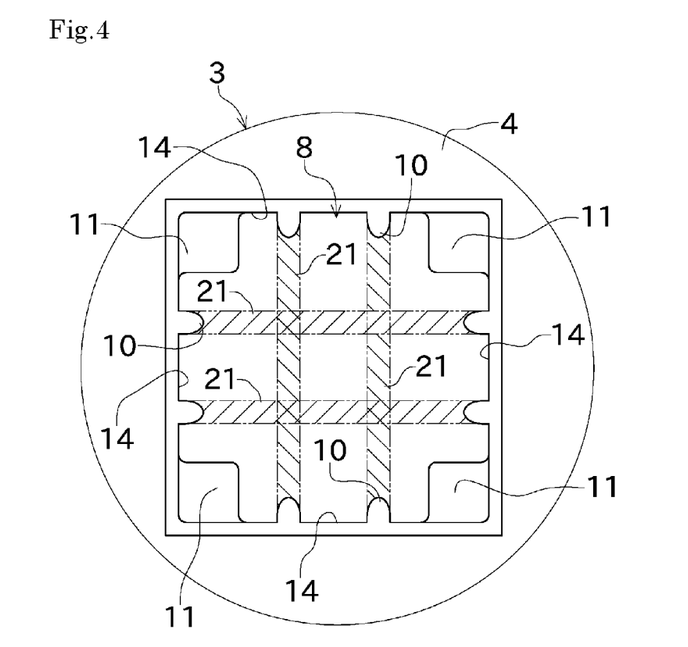
FIG. 4 A plane view illustrating shaving reachable regions.

As illustrated in FIG. 4, when viewed in the press-fit direction, the shavings reachable regions 21 have the same width as that of the press-fit ribs 10. Moreover, the shavings reachable regions 21 are formed in a long and narrow way elongated along the protruding direction of each of the press-fit ribs 10 continuously from each of the press-fit ribs 10 to the opposing inner peripheral wall surfaces 14. Accordingly, it can be said that the shavings reachable regions 21 are the loca being imaginary drawn by the press-fit ribs 10 when the press-fit ribs 10 are virtually moved along the protruding directions thereof to the opposing inner peripheral wall surfaces 14.

As mentioned above, the shavings reachable regions 21 are the regions where the shavings 20 are easily projected. Accordingly, if the contact parts 11 are disposed in such a manner as to overlap the shavings reachable regions 21 in the press-fit direction, there are high possibility that the shavings 20 are protruded above the contact parts 11. In this case, there are high possibility that the shavings 20 are caught between the contact parts 11 and the nut 7. On the other hand, when the contact parts 11 are positioned to areas that do not overlap the shavings reachable regions 21 in the press-fit direction, it is not likely that the shavings 20 are protruded above the contact parts 11. Accordingly, in this case, it is not likely that the shavings 20 are caught between the contact parts 11 and the nut 7.

Therefore, in the present embodiment, the contact parts 11 are not disposed to positions that will overlap the shavings reachable regions 21 in the press-fit direction. In other words, as shown in FIG. 4, the contact parts 11 are not disposed to positions that will interfere the shavings reachable regions 21 as viewed in the press-fit direction.

More specific description will be given as follows. As described above, in the present embodiment, the press-fit ribs 10 are formed on the center part of each of the sides of the quadrilateral shape of the inner peripheral wall surfaces 14 when viewed in the press-fit direction, and the contact parts 11 are disposed in the vicinity of each of the four corners of said quadrilateral shape (FIG. 3 and FIG. 4). And each of the contact parts 11 in the four corners is leaving a space with each other. As such, the contact parts 11 can be disposed in positions that will not overlap the shavings reachable regions 21 in the press-fit direction (see FIG. 4).

Accordingly, since the contact parts 11 are disposed in positions that will not overlap the shavings reachable regions 21 in the press-fit direction, the shavings 20 do not project above the contact parts 11. As such, the shavings 20 are prevented from being caught between the contact parts 11 and the nut 7, and thereby floating of the nut 7 from the contact part 11 can surely be prevented.

In the present embodiment, the contact parts 11 are merely disposed in the four corners. Accordingly, compared with Patent Document 1, the area (the size of the contact parts 11) of portions that can come into contact with the nut 7 from below is diminished. However, when the contact parts 11 are disposed as with the present embodiment, the four corners of the nut 7 can be supported from below respectively. As such, the nut 7 can be supported in a well-balanced state, and thereby the nut 7 is prevented from getting unstable. Thus, although the contact parts 11 of the present embodiment have relatively small area that will come into contact with the nut 7, the nut 7 can be stably supported.

Hereinafter, a distance between an upper end of the press-fit ribs 10 to the contact parts 11 in the press-fit direction is defined as L1, and a distance between the contact parts 11 and the bottom surface 12 in the press-fit direction is defined as L2 (see FIG. 5). Among the whole length of the press-fit ribs 10, the portions that will be abraded by the nut 7 are merely the areas indicated by the L1. Accordingly, it is considered that the lengths of the slender belt-like shape shavings 20 produced by abrasion of the press-fit ribs 10 does not become longer than L1.

Thus, in the present embodiment, the distance L2 between the contact parts 11 and the bottom surface 12 in the press-fit direction is made longer than the distance L1 between the upper end of the press-fit ribs 10 and the contact parts 11 in the press-fit direction. Because of this configuration, even if the long and narrow shavings 20 are hanged down as illustrated in FIG. 7, the tip ends of the shavings 20 does not come into contact with the bottom surface 12. Accordingly, the tip ends of the shavings 20 are prevented from coming into contact with the bottom surface 12, and thus, occurrence of a strange sound can be prevented.

The shavings 20 are produced by the press-fit ribs 10 being abraded from the upper side to the lower side. If the press-fit ribs 10 are abraded to the lower end portions, the shavings 20 will be torn off and separated from the lower end portion. If the shavings 20 are separated from the press-fit ribs 10, said shavings 20 will be scattered within the nut press-fit portion 8, and cause a strange sound etc.

Thus, as mentioned above, in the present embodiment, the press-fit ribs 10 are formed continuously from the upper ends of the inner peripheral wall surfaces 14 to the lower ends of the inner peripheral wall surfaces 14. Furthermore, the lower end portions of the press-fit ribs 10 are connected to the bottom surface 12. In the nut press-fit portion 8 of the present embodiment, since the nut 7 does not reach the bottom surface 12, the press-fit ribs 10 will not be abraded to the lower end portions. Accordingly, the shavings 20 are hardly torn off in the middle and separated from the press-fit ribs 10. That is, even if the nut 7 is press-fitted to the end as shown in FIG. 7 and the like, the shavings 20 are easily kept in a state where the shavings 20 are connected to the press-fit ribs 10. Accordingly, the shavings 20 will not be scattered within the nut press-fit portion 8, and thereby occurrence of a strange sound etc. can be prevented.

If the press-fit ribs 10 are formed discontinuously in the press-fit direction, it will be difficult to mold the press-fit ribs 10. As described above, in the present embodiment, the press-fit ribs 10 are formed continuously to the bottom surface 12. As such, there is no particular difficulty in molding the press-fit ribs 10. Furthermore, since the lower end portions of the press-fit ribs 10 are connected to the bottom surface 12, strength of the press-fit ribs 10 can be ensured sufficiently.

As described above, the base body 3 of the present embodiment includes the nut press-fit portion 8 to which the nut 7 is press-fitted in the press-fit direction. The nut press-fit portion 8 includes the bottom surface 12, the inner peripheral wall surfaces 14, the press-fit ribs 10, and the contact parts 11. The bottom surface 12 is opposing to the press-fit direction. The inner peripheral wall surfaces 14 are generally parallel to the press-fit direction. The press-fit ribs 10 are protruded from the inner peripheral wall surfaces 14 and are elongated along the press-fit direction so as to contact the peripheral surfaces of the press-fitted nut 7. The contact parts 11 are arranged above the bottom surface 12 so as to contact the press-fitted nut 7 from the lower side. Furthermore, the contact parts 11 are not disposed to positions that will overlap toward the shavings reachable regions 21 as viewed in the press-fit direction.

That is, the shavings 20 produced by abrasion of the press-fit ribs 10 tend to occur in such a manner as to project toward the protruding direction of the press-fit ribs 10. Accordingly, the contact parts are not disposed in said regions, which can prevent the shavings from getting between the nut 7 and the contact parts 11 by not disposing the contact parts 11 in said regions.

As described above, with respect to the base body 3 of the present embodiment, the internal circumference shape of the nut press-fit portion 8 is formed into a quadrilateral shape in accordance with the peripheral shape of the nut 7. The press-fit ribs 10 are formed in the vicinity of the center parts of the sides of said quadrilateral shape. The contact parts 11 are disposed in the vicinity of the corners of said quadrilateral shape.

Accordingly, the corners of the press-fitted nut 7 can be supported from below by disposing the contact parts 11 in the vicinity of the corners of said quadrilateral shape. As such, the nut 7 can be stably supported.

As described above, with respect to the base body 3 of the present embodiment, the contact parts 11 are disposed in the vicinity of each of the four corners of said quadrilateral shape.

Accordingly, each of the four corners of the nut 7 can be supported from below by disposing the contact parts 11 in each of the four corners. As such, the nut 7 can be stably supported.

When viewed from other point of view, the base body of the above-described embodiment can be described as follows. That is, the base body 3 of the present embodiment includes a nut press-fit portion 8 to which a nut 7 is press-fitted in a press-fit direction. The nut press-fit portion 8 includes the bottom surface 12, the inner peripheral wall surfaces 14, the press-fit ribs 10, and the contact parts 11. The bottom surface 12 is opposing to the press-fit direction. The inner peripheral wall surfaces 14 are generally parallel to the press-fit direction. The press-fit fibs 10 are protruded from the inner peripheral wall surfaces 14 and elongated along the press-fit direction so as to contact peripheral surfaces of the press-fitted nut 7. The contact parts 11 are arranged above the bottom surface 12 so as to contact the press-fitted nut 7 from lower side. Furthermore, the internal circumference shape of the nut press-fit portion 8 is formed into a quadrilateral shape in accordance with the peripheral shape of the nut 7. The press-fit fibs 10 are formed in the vicinity of the center part of each of said quadrilateral shape.

The contact parts 11 are disposed in the vicinity of four corners of the quadrilateral shape leaving spaces between each other.

With this configuration, the contact parts 11 can be arranged while avoiding the circumferences of the press-fit ribs 10. Accordingly, the shavings 20 produced by abrasion of the press-fit ribs 10 are prevented from getting between the contact parts 11 and the nut 7. Since the contact parts 11 are arranged as above, the four corners of the nut 7 are contacted with the contact parts 11 from below. As such, the nut 7 can be stably supported.

As described above, the base body 3 of the present embodiment is configured as follows. That is, the distance L2 between the contact parts 11 and the bottom surface 12 in the press-fit direction is longer than the distance L1 between the upper end portion of the press-fit ribs 10 and the contact parts 11 in the press-fit direction.

Thus, even if the shavings 20 produced by abrasion of the press-fit ribs 10 are hanged down in band forms, the tip ends of the shavings 20 do not come into contact with the bottom surface 12.

As described above, the base body 3 of the present embodiment is configured as follows. That is, the press-fit ribs 10 are formed continuously in the press-fit direction. The lower end portions of the press-fit ribs 10 are connected to the bottom surface 12.

By forming the press-fit ribs 10 continuously down to the bottom surface 12, the shavings 20 can be prevented from being torn off in the middle and being separated from the press-fit ribs 10. Furthermore, strength of the press-fit ribs 10 can be ensured by connecting the press-fit ribs 10 to the bottom surface 12.

As described above, the electric junction box 1 of the present embodiment includes the above-described base body 3.

In this electric junction box 1, the nut 7 can be surely fixed to the base body 3. Accordingly, the plate 2 can surely be attached to the base body 3. Thus, reliability of the electric junction box 1 can be improved.

Although preferred embodiments of the present invention have been described above, the above-described configuration can be modified, for example, as follows.

The base body of the present invention is not limited to the electric junction box. The base body can be widely applied to configurations in which the nut 7 is needed to be press-fitted and fixed. The base body of the present embodiment may be applied to, for example, a terminal unit in which terminals for connecting to an external battery are possessed with respect to an electric motor.

In the above-described embodiment, the bottom surface 12 is a plane orthogonal to the press-fit direction. However, the configuration of the bottom surface 12 is not limited to this. Any bottom surface 12 is acceptable as long as the bottom surface 12 is opposing to the press-fit direction and the bottom surface 12 is disposed to a position lower than the contact parts 11 (that is, a position where the bottom surface 12 does not come into contact with a nut). The bottom surface 12 is not necessarily required to be a plane that is exactly orthogonal to the press-fit direction. Accordingly, the bottom surface 12 may be inclined relative to the press-fit direction. The bottom surface may be formed unevenly, or holes may be formed on the bottom surface. These configuration does not have an influence on the effects of the present invention.

In the above-described embodiment, two press-fit ribs 10 are formed in each of the four sides of the quadrilateral shape of the inner peripheral wall surfaces 14 as viewed in the press-fit direction. However, the number of the press-fit ribs formed on each side may be one, or three or more. The press-fit ribs 10 are not necessarily required to be formed in each side. The nut 7 can be fixed as long as the press-fit rib 10 is formed on any one of the four sides of the quadrilateral shape of the inner peripheral wall surfaces 14 as viewed in the press-fit direction. The positions in which the press-fit ribs 10 are formed is not necessarily limited to the vicinity of the center portion of each of the four sides. The press-fit ribs 10 may be formed on any proper positions.

In the above-described embodiment, the nut 7 has a quadrilateral shape. However, the shape of the nut is not limited to this. The configuration of the present invention may be applied to a configuration for press-fitting and fixing a polygon-shaped nut (for example, a hexagon nut). When the nut 7 is formed into a line-symmetric shape (for example, a square, an isosceles trapezoid, a rectangle, a hexagon, or the like), the press-fit ribs 10 may be arranged between the contact parts 11 so as to be disposed in a line symmetric manner with respect to the axis of symmetry of the nut 7.

In the above-described embodiment, the contact parts 11 are provided in the vicinity of each of the four corners of the quadrilateral nut press-fit portion 8. However, the configuration of the contact parts 11 are not limited to this. The nut 7 can be stably supported as long as the contact parts 11 are formed on at least two corners among the four corners. When polygon-shaped nut having five or more corners (for example, a hexagon nut) is press-fitted, the shape of the nut press-fit portion 8 is also a polygon having five or more corners (for example, a hexagon). In this case, the contact parts 11 may be provided in the vicinity of each of the corners. It is preferable that the contact parts 11 are formed on at least three corners when the shape of the nut press-fit portion 8 is a polygon having five or more corners.

In the above-described embodiment, the contact parts 11 are formed on the corners of the nut press-fit portion 8. However, the arrangement positions of the contact parts 11 are not limited to this. The contact parts 11 may be arranged in any position as long as the arrangement positions do not interfere the shavings reachable regions 21 shown in FIG. 4 as viewed in the nut press-fit direction.

As mentioned above, the positions where the press-fit ribs 10 are formed may be appropriately changed. That is, the press-fit ribs 10 may be formed in positions differently from the positions shown in FIG. 4. When the press-fit ribs 10 are formed in positions differently from FIG. 4, the shavings reachable regions 21 is also arranged differently from the positions shown in FIG. 4. In this case, the positions where the contact parts 11 can be disposed are different from the positions shown in FIG. 4. After all, the arrangement of the contact parts 11 should be determined in relation to the positions where the press-fit ribs 10 are formed. Accordingly, the arrangement is not limited to the way shown in the above embodiment.

Figure 9:
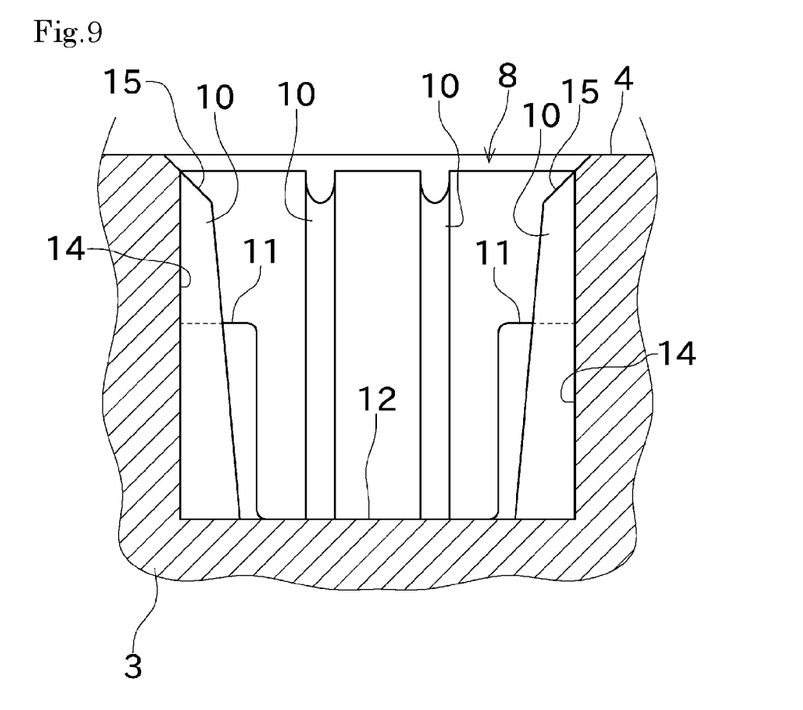
FIG. 9 A side cross-sectional view illustrating an alternative example of a nut press-fit portion.

In the above-described embodiment, the press-fit ribs 10 have the inclined planes 15 on the upper end. However, the configuration of the press-fit ribs 10 is not limited to this. That is, the inclined planes 15 may be abbreviated. Furthermore, as shown in FIG. 9, the whole bodies of the press-fit ribs may be tilted (tapered).

DESCRIPTION OF THE REFERENCE NUMERALS 3 base body
7 nut 8 nut press-fit portion
10 press-fit rib
11 contact part
12 bottom surface
14 inner peripheral wall surface
20 shaving
21 shavings reachable region

The invention claimed is:

1. A base body including a nut press-fit portion to which a nut is press-fitted in a press-fit direction, the nut press-fit portion comprising:
a bottom surface opposing to the press-fit direction;
inner peripheral wall surfaces generally parallel to the press-fit direction;
press-fit ribs protruded from the inner peripheral wall surfaces elongated along the press-fit direction so as to contact peripheral surfaces of the press-fitted nut; and
contact parts arranged in an upstream side of the bottom surface in the press-fit direction so as to contact the press-fitted nut from a downstream side in the press-fit direction, wherein
the contact parts are not disposed to positions that will overlap toward loca of the press-fit ribs in the press-fit direction,
the loca being imaginary drawn by the press-fit ribs when the press-fit ribs are virtually moved along the protruding direction thereof to the opposing inner peripheral wall surface.

2. The base body according to claim 1, wherein
an internal circumference shape of the nut press-fit portion is formed into a polygon in accordance with a peripheral shape of the nut,
the press-fit ribs are formed in the vicinity of the center parts of the sides of the polygon, and
the contact parts are disposed in the vicinity of the corners of the polygon.

3. The base body according to claim 2, wherein
the contact parts are disposed at least in the vicinity of each of the corners of the polygon.

4. The base body according to claim 1, wherein
a distance between the contact parts and the bottom surface in the press-fit direction is longer than a distance between upstream end portions of the press-fit ribs and the contact parts in the press-fit direction.

5. The base body according to claim 1, wherein
the press-fit ribs are formed continuously in the press-fit direction, and
downstream end portions of the press-fit ribs in the press-fit direction are connected to the bottom surface.

6. The base body according to claim 1, wherein an electric junction box comprises the base body.

7. The base body according to claim 1, wherein a terminal unit comprises the base body.

8. A base body including a nut press-fitted portion to which a nut is press-fitted in a press-fit direction, the nut press-fit portion comprising:
a bottom surface opposing to the press-fit direction;
inner peripheral wall surfaces generally parallel to the press-fit direction;
press-fit ribs protruded from the inner peripheral surfaces elongated along the press-fit direction so as to contact peripheral surfaces of the press-fitted nut; and
contact parts arranged in an upstream side of the bottom surface in the press-fit direction so as to contact the press-fitted nut from a downstream side in the press-fit direction, wherein
an internal circumference shape of the nut press-fit portion is formed into a polygon in accordance with a peripheral shape of the nut,
the press-fit ribs are formed in the vicinity of the center part of each of the sides of the polygon,
the contact parts are disposed in the vicinity of at least two corners among the corners of the polygon leaving a space between each other,
the contact parts are not disposed to positions that will overlap toward loca of the press-fit ribs in the press-fit direction, and
the loca being imaginary drawn by the press-fit ribs when the press-fit ribs are virtually moved along the protruding direction thereof to the opposing inner peripheral wall surface.

9. The base body according to claim 8, wherein
a distance between the contact parts and the bottom surface in the press-fit direction is longer than a distance between upstream end portions of the press-fit ribs and the contact parts in the press-fit direction.

10. The base body according to claim 8, wherein
the press-fit ribs are formed continuously in the press-fit direction, and
downstream end portions of the press-fit ribs in the press-fit direction are connected to the bottom surface.

11. The base body according to claim 8, wherein an electric junction box comprises the base body.

12. The base body according to claim 8, wherein a terminal unit comprises the base body.

* * * * *